United States Patent
Nakamura

[19]

[11] Patent Number: 6,066,897
[45] Date of Patent: May 23, 2000

[54] AUTOMATIC LOAD DISTRIBUTING APPARATUS FOR GENERATOR AND METHOD OF CONTROLLING SAME

[75] Inventor: Tadao Nakamura, Oyama, Japan

[73] Assignee: Komatsu Ltd., Tokyo, Japan

[21] Appl. No.: 09/117,014

[22] PCT Filed: Jan. 20, 1997

[86] PCT No.: PCT/JP97/00107

§ 371 Date: Jul. 20, 1998

§ 102(e) Date: Jul. 20, 1998

[87] PCT Pub. No.: WO97/26453

PCT Pub. Date: Jul. 24, 1997

[30] Foreign Application Priority Data

Jan. 19, 1996 [JP] Japan ........................................ 8/26196

[51] Int. Cl.$^7$ ................................ F02D 41/00; H02J 3/00
[52] U.S. Cl. ........................... 290/4 A; 290/4 R; 307/19; 322/22
[58] Field of Search ................................. 290/4 R, 4 A, 290/40 R, 40 A; 307/19, 20, 57; 322/17, 22, 23

[56] References Cited

U.S. PATENT DOCUMENTS

| | | | |
|---|---|---|---|
| 4,356,402 | 10/1982 | Morimoto et al. | 307/19 |
| 4,403,292 | 9/1983 | Ejzak et al. | 364/492 |
| 4,488,198 | 12/1984 | Christen et al. | 361/20 |
| 4,967,096 | 10/1990 | Diemer et al. | 307/19 |
| 5,583,419 | 12/1996 | Haller | 322/2 |
| 5,605,135 | 2/1997 | Netherwood | 123/479 |
| 5,606,245 | 2/1997 | Kirby | 322/8 |
| 5,754,033 | 5/1998 | Thomson | 322/45 |

FOREIGN PATENT DOCUMENTS

| | | |
|---|---|---|
| 57-156840 | 10/1982 | Japan . |
| 58-204965 | 11/1983 | Japan . |
| 59-39949 | 3/1984 | Japan . |
| 60-38041 | 3/1985 | Japan . |
| 61-224834 | 10/1986 | Japan . |
| 63-55296 | 11/1988 | Japan . |

Primary Examiner—A. Ponomarenko
Attorney, Agent, or Firm—Sidley & Austin

[57] ABSTRACT

An automatic load distributing apparatus for generators is of simple construction and occupies a small space and can automatically distribute loads evenly on respective engines upon parallel load operation of generators of different capacities and provide labor saving of operation. The automatic load distributing apparatus for generators comprises a plurality of engines for driving a plurality of generators connected in parallel to a common load, a plurality of fuel injection pumps and a plurality of load distributing units for distributing outputs corresponding to the load to the engines. The apparatus comprises a first rotational speed sensor (31a) and a first rack sensor (4a) installed on a first engine (2a), respective rotational speed sensors and respective rack sensors installed on respective engines other than the first engine, first control means (11a) for receiving a signal from the first rack sensor to determine a load factor for the first engine to issue the same to the respective engines, and respective control means for determining respective load factors for the respective engines and comparing them with the signal from the first control means to output commands to respective fuel injection pumps so as to make the respective load factors to be identical to a load factor of the first engine which has become a maximum load factor. Also the first control means prevents overload by sequentially issuing startup commands to respective self-starting motors (13b) when a load factor of the first engine exceeds a predetermined value.

5 Claims, 6 Drawing Sheets

AUTOMATIC LOAD DISTRIBUTING APPARATUS FOR GENERATOR AND METHOD OF CONTROLLING SAME

TECHNICAL FIELD

The present invention relates to an automatic load distributing apparatus for generators, and in particular, to an automatic load distributing apparatus for operating a plurality of diesel engine driven generators connected in parallel.

BACKGROUND ART

When a plurality of diesel engine driven generators are connected for parallel load operation, an automatic load distributing apparatus is provided to make loads on the respective generators substantially even. FIG. 8 is for explaining general construction of an automatic load distributing apparatus which is frequently used for conventional generators driven by diesel engines with Bosch fuel injection pumps.

Upon parallel load operation of such generators, a first diesel engine driven generator 20a and a second diesel engine driven generator 20b are arranged in parallel. The first diesel engine driven generator 20a is connected to a bus bar 23 via a wire 21a and a first breaker 22a. The second diesel engine driven generator 20b is also connected to the bus bar 23 via a wire 21b and a second breaker 22b.

The first diesel engine driven generator 20a is constructed of a first engine 24a, a first generator 25a, a first load distributing unit 26a, and a first rotational speed controller 27a. The second diesel engine driven generator 20b is of the same construction as the first diesel engine driven generator 20a and the description thereof is omitted below by labeling respective elements with corresponding reference numerals.

The first engine 24a is constructed of a first Bosch fuel injection pump 28a, a first governor 29a, a first actuator 30a, and a first rotational speed sensor 31a. A control lever 32a, installed on the first governor 29a, and a lever 33a, installed on the first actuator 30a, are connected by a rod 34a. The first actuator 30a and the first rotational speed controller 27a are connected by a wire 35a; the first rotational speed sensor 31a and the first rotational speed controller 27a are connected by a wire 36a.

The first load distributing unit 26a is connected to the first rotational speed controller 27a via a wire 37a, and to bus bars 38 and 40 of parallel line via wires 39a and 41a, respectively. The first load distributing unit 26a and the first generator 25a are connected via both a voltage detecting wire 42a and a current detecting wire 43a.

Hereinbelow, the description will be made first of a single load operation of the first generator 25a in the first diesel engine driven generator 20a, and then to a parallel load operation of the first generator 25a and the second generator 25b in the second diesel engine driven generator 20b.

First of all, the single load operation of the first generator 25a is described with reference to FIG. 2. FIG. 2 shows the rack position of the first fuel injection pump 28a in ordinate and the rotational speed of the first fuel injection pump 28a in abscissa. The rack position in the ordinate has one to one correspondence to the load factor of the output of the first engine 24a. Indicated from an operating point a to an operating point b is the upper limit of the rack position, which corresponds to 100% of the load factor. An operating point j indicates a rated output/rated rotational speed of the first engine 24a. Indicated from the operating point b to an operating point c is an actual range of use, which corresponds to an operating range of the first governor 29a. A rated rotational speed A is determined by the number of electrodes and the frequency of the generator in the case of an engine for the generator, where the engine is operated at constant rotational speed.

Upon no-load operation after completion of engine warm-up, the rack position is at an operating point c. Then when the first generator 25a is connected to the bus bar 23 by turning the first breaker 22a "ON" and a load, e.g., of 80% of the generator rated output value, is applied to the first generator 25a from the outside, the first governor 29a acts to transitionally move the rack position from the operating point c to an operating point d. At the same time, the amount of fuel injection to the first engine 24a, and hence its output power, increases. However, the rotational speed at the operating point d is decreased by B from the rated rotational speed A, and needs to be increased to an operating point e.

The increase in the rotational speed from the operating point d to the operating point e is controlled by the first rotational speed controller 27a. In this case, an engine rotational speed signal from the first rotational speed sensor 31a is inputted to the first rotational speed controller 27a via the wire 36a. Upon receipt of the signal, the first rotational speed controller 27a sends a signal corresponding to the increased rate B of the rotational speed to the first actuator 30a via the wire 35a to move the lever 33a on the first actuator 30a in a direction of "INCREASE" in rotational speed, and hence the control lever 32a via the rod 34a. Thus the rotational speed is increased, and the single load operation of the first generator 25a is carried out at the operating point e by an engine output corresponding to a load of 80% of the rated output value of the first generator 25a.

Next, a parallel load operation of the first generator 25a and the second generator 25b will be is described with reference to FIGS. 3 and 4. As an example, the description is made to a case where the first generator 25a is operated while gradually decreasing its load from 80% to 40% and the second generator 25b is operated from an unloaded condition while gradually increasing its load from 0% to 40%.

The 80% loaded operation of the first generator 25a is indicated at the operating point e in FIG. 3; the unloaded operation of the second generator 25b is indicated at an operating point g in FIG. 4. From this operating condition, the second breaker 22b is turned "ON" to connect the second generator 25b to the bus bar 23 so as to start parallel load operation.

A comparison between the 80% load factor of the first generator 25a and the 0% load factor of the second generator 25b is made by the first load distributing unit 26a and the second load distributing unit 26b. In this case, an output signal from the first generator 25a is inputted to the first load distributing unit 26a via the voltage detecting wire 42a and the current detecting wire 43a. At the same time, an output signal from the second generator 25b is inputted to the second load distributing unit 26b via the voltage detecting wire 42b and the current detecting wire 43b. Then, an output signal from the second load distributing unit 26b is inputted to the first load distributing unit 26a via a wire 41b, the bus bar 40 of parallel line, and the wire 41a. The first load distributing unit 26a compares the output signal corresponding to the 80% load factor of the first generator 25a with the output signal corresponding to the 0% load factor of the second generator 25b and processes the comparison result to output a signal to the first rotational speed controller 27a so as to reduce the rotational speed of the first engine 24a. The first rotational speed controller 27a performs control, using the signal for reducing the rotational speed of the first engine 24a and a signal from the first rotational speed sensor 31a to send a signal corresponding to a rotational speed drop rate C to the first actuator 30a via the wire 35a. This signal moves the lever 33a on the first actuator 30a in a direction of "DECREASE" in rotational speed, and hence the control lever 32a via the rod 34a. Thus the engine speed is reduced.

The second generator 25b is also operated in a manner similar to the first generator 25a to increase the engine speed.

Through the above operation, the load factor of the first generator 25a is gradually decreased from 80% to 40%, the load factor of the second generator 25b is gradually increased from 0% to 40%, and they are finally made to be equivalent. In other words, the loaded condition of the first generator 25a in FIG. 3 is gradually decreased from its 80% load factor at the operating point e to its 40% load factor at an operating point f, while the loaded condition of the second generator 25b in FIG. 4 is gradually increased from its 0% load factor at the operating point g to its 40% load factor at an operating point h. Thus, the loads are automatically evenly distributed on the engines for the first and second generators 25a and 25b at a load factor of 40%.

Such a conventional technique, however, causes the following problems with the first and second load distributing units 26a and 26b.

(1) The loads for the first and second generators 25a and 25b are detected as signals from the generators. Since such outputs are too large, the voltage and current signals are necessarily drawn through respective transformers. Further, since the wiring is of a three-phase type, a total of six wires, three for voltage plus three for current, is required. This increases the number of assembling steps associated with the wiring on the outgoing side of the first and second generators 25a and 25b and the side of the first and second load distributing units 26a and 26b, and makes the entire construction complicated in cooperation with the provision of the transformers required for drawing voltage and current signals.

(2) If the apparatus is designed to obtain loads on the first and second generators 25a and 25b at a high voltage, such as 400 volts, without transformers, there is a danger of shock due to mishandling in maintenance and outfitting operations. Such a case requires skilled technical experts to work.

(3) Since the control apparatus for the first and second generators 25a and 25b is divided into a group of the first and second load distributing units 26a and 26b and a group of the first and second rotational speed controllers 27a and 27b, it occupies a large space. Mounting brackets are also required for respective control components, and hence the number of assembling steps is increased.

(4) Assuming that the first generator 25a is a 400-kilowatt generator and the second generator 25b is a 200-kilowatt generator, voltage and current transformers for 400 kilowatts and 200 kilowatts need to be mounted respectively on the first generator 25a and the second generator 25b when both generators are connected for parallel load operation. In this case, when the transformer for 400 kilowatts is incorrectly mounted on the second generator 25b like the first generator 25a upon parallel load operation, the respective load factors of the first and second generators remain uneven. If a load of 450 kilowatts is applied from the outside during the parallel load operation, the first generator 25a is loaded at 225 kilowatts and its load factor is 56.3%, while the second generator 25b is loaded at 225 kilowatts and its load factor is 112.5%. As a result, the second engine 24b for driving the second generator 25b exceeds its rated power and has operational problems.

DISCLOSURE OF THE INVENTION

In consideration of the conventional problems, it is an object of the present invention to provide an automatic load distributing apparatus for generators and a method of controlling the same, in which the apparatus is of simple construction and occupies a small space, requires no transformers and hence reduces the number of assembling steps without any danger of shock, and can automatically distribute loads evenly on the respective engines upon parallel load operation of generators of different capacities, and provides labor saving of operation.

According to a first aspect of the present invention, an automatic load distributing apparatus for generators comprises a plurality of generators connected in parallel to a common load, a plurality of engines for driving the respective generators, a plurality of fuel injection pumps installed on the respective engines, and a plurality of load distributing units for distributing outputs corresponding to the loads on the engines.

The apparatus comprises a first rotational speed sensor for detecting the rotational speed of a first engine; a first rack sensor for detecting the load on the first engine; a second rotational speed sensor for detecting the rotational speed of a second engine; first control means for receiving signals from the first rotational speed sensor and the first rack sensor for detecting the load on the first engine, for outputting a command to a first fuel injection pump so as to maintain the first engine at a constant rotational speed which can be increased or decreased according to the load, and for outputting a command to a second control means to increase the load on the second engine when the load on the first engine exceeds the load on the second engine; and the second control means for comparing the load signal from the first control means with the load on the second engine to output a command to a second fuel injection pump so as to make the load on the second engine to be identical to that on the first engine.

In such construction, loads are automatically distributed evenly on the first and second engines. Since the construction is simplified by detecting the load on the first engine at the first rack sensor and by integrating a first load distributing unit with a first rotational speed controller, the first control means is made compact to reduce the space occupied by the apparatus to one-half of the conventional one. Also, since outgoing connections for load detection can be of simple single phase wiring of low voltage and low current without the need for a transformer, the number of assembling steps is largely reduced, and besides, safety is improved without danger of shock due to mishandling in maintenance and outfitting operations. Furthermore, although the conventional apparatus has caused such a problem that an engine has operational problems upon parallel load operation of generators of different capacities because of uneven load factors, resulting from incorrect mounting of transformers of an identical capacity, it is improved by having the first rack sensor detect the load.

According to a second aspect of the present invention, the second engine includes a second rotational speed sensor and a second rack sensor for detecting the load on the second engine. In this case, the first control means receives signals from the first rotational speed sensor and the first rack sensor for detecting the load on the first engine. Then, the first control means outputs a command to the first fuel injection pump so as to maintain the first engine at a constant rotational speed, and when the load on the first engine exceeds the load on the second engine, outputs a command to the second control means to increase the load on the second engine. As the load on the second engine increases, the load on the first engine automatically decreases. Then when the loads on the first and second engines are made to be identical, the command to increase the load on the second engine is stopped.

In such construction, the apparatus can distribute loads evenly if the load on the second engine is heavier than that on the first engine as well as achieve the same improvements as in the first aspect of the present invention.

According to a third aspect of the present invention, an automatic load distributing apparatus for generators comprises a plurality of generators connected in parallel to a common load, a plurality of engines for driving the respective generators, a plurality of fuel injection pumps installed on the respective engines, and a plurality of load distributing units for distributing outputs corresponding to the loads on the engines.

The apparatus comprises: a first rotational speed sensor, for detecting the rotational speed of a first engine; a first rack sensor, for detecting the load on the first engine; respective rotational sensors for detecting respective rotational speeds of engines other than the first engine; respective rack sensors for detecting the loads on the respective engines; first control means for receiving signals from the first rotational speed sensor and the first rack sensor for detecting the load on the first engine, and for determining a load factor (output/rated output×100) for the first engine to issue the same to the respective engines; and respective control means for determining respective load factors for the respective engines and for comparing them with the signal from the first control means to output commands to respective fuel injection pumps so as to make the respective load factors to be identical to the load factor of the first engine which has become a maximum load factor.

In such construction, the apparatus can automatically distribute loads evenly on the first engine and the other respective engines as well as achieve the same improvements as in the first aspect of the present invention.

According to a fourth aspect of the present invention, the first engine and the respective engines other than the first engine further comprise a first self-starting motor and other respective self-starting motors, respectively. Also, the first control means receives the signals from the first rotational speed sensor and the first rack sensor for detecting the load on the first engine, and determines the load factor for the first engine, to issue startup commands to the respective self-starting motors sequentially so as to prevent overload when the load factor for the first engine exceeds a predetermined value.

In such construction, the apparatus can automatically distribute loads evenly on the first engine and the engines that have received the startup commands, and can provide savings in labor operations.

According to a fifth aspect of the present invention, a method of controlling an automatic load distributing apparatus for generators comprises the step of starting a plurality of engines, for driving a plurality of generators connected in parallel to a common load, sequentially according to the common load to distribute outputs corresponding to the common load to the engines.

The control method comprises the steps of starting the plurality of engines sequentially according to the common load to determine the respective load factors so as to detect a maximum load factor as a result of the comparison of the respective load factors, transmitting the maximum load factor sequentially to engines other than the engine of which the load factor has become the maximum load factor, and increasing the load factors of the respective engines sequentially in such a manner as to make the load factor of each engine identical to the maximum load factor.

Such a control method allows the apparatus to automatically distribute loads evenly on the engines and provide savings in labor operations.

In addition, the automatic load distributing apparatus for generators and the control method therefor require only one parallel line bus bar for the signal of the maximum load factor, and this makes the bus bar simple.

BEST MODES FOR CARRYING OUT THE INVENTION

Referring to FIGS. 1 to 4, the first embodiment of the present invention will be described in detail.

Figure 1:
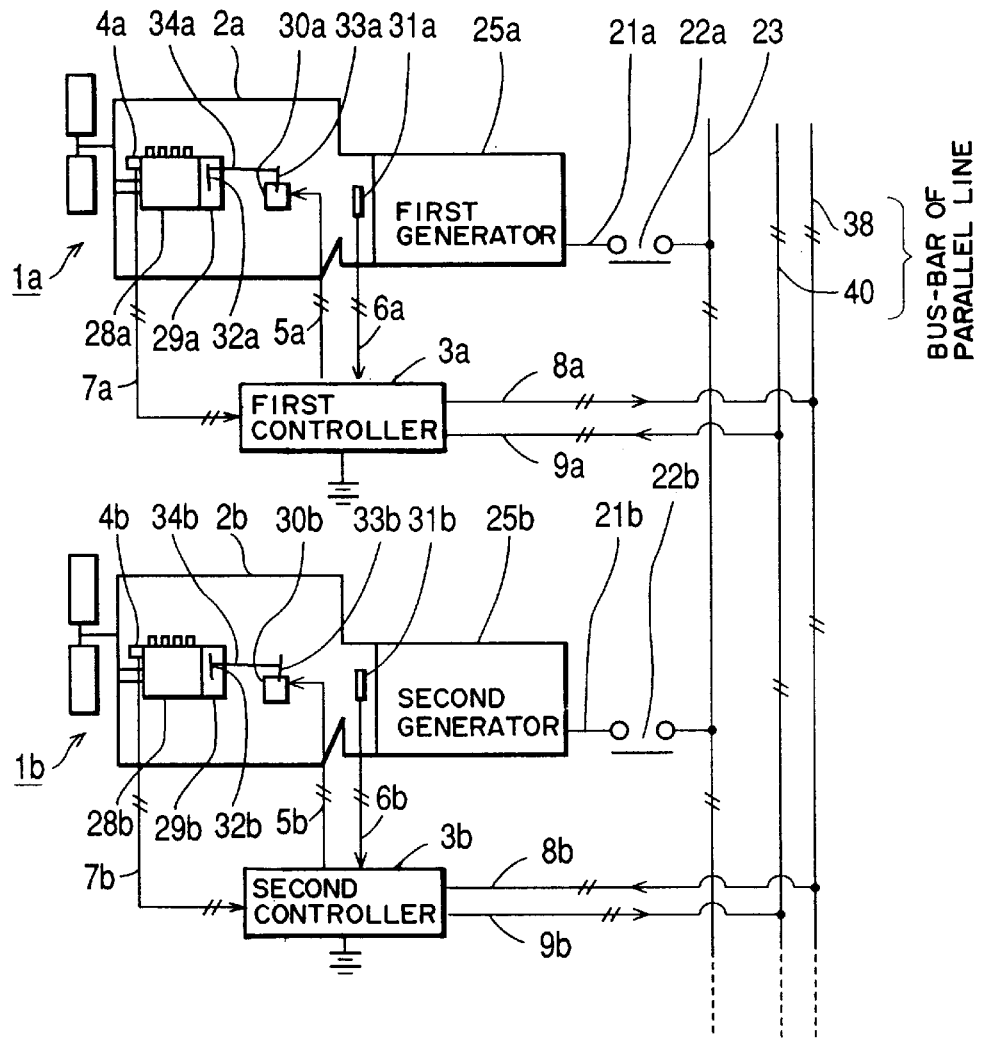
FIG. 1 is a diagram of the general construction of an automatic load distributing apparatus for generators according to a first embodiment of the present invention.

FIG. 1 is a diagram of the general construction of an automatic load distributing apparatus for generators. Components common to those of the prior art are given the same reference numerals and the description thereof is omitted. Also, components in a first diesel engine driven generator 1a are given a suffix a and components in a second diesel engine driven generator 1b are given a suffix b. Hereinbelow, the description is made of the first diesel engine driven generator 1a. The second diesel engine driven generator 1b has the same construction and the description thereof is omitted.

The first and second diesel engine driven generators 1a and 1b are arranged in parallel. The first diesel engine driven generator 1a is connected to a bus bar 23 via a wire 21a and a first breaker 22a. The first diesel engine driven generator 1a is constructed of a first engine 2a, a first generator 25a, and a first controller 3a as a control means.

The first engine 2a is constructed of a first Bosch fuel injection pump 28a, a first governor 29a, a first actuator 30a, a first rotational speed sensor 31a, and a first rack sensor 4a. A control lever 32a, installed on the first governor 29a, and a lever 33a, installed on the first actuator 30a, are connected by a rod 34a. The first actuator 30a and the first rotational speed controller 3a are connected by a wire 6a; the first rack sensor 4a and the first controller 3a are connected by a wire 7a.

The first controller 3a and a parallel line bus bar 38 are connected by a wire 8a. The bus bar 38 is always supplied with a signal indicative of the maximum load factor of the engines arranged in parallel. The first actuator 30a can be directly connected to a rack so that the first governor 29a, the control lever 32a, and the rod 34a can be omitted.

Hereinbelow, description will be made first of a single load operation of the first diesel engine driven generator 1a, and then to a parallel load operation of the first diesel engine driven generator 1a and the second diesel engine driven generator 1b.

Figure 2:
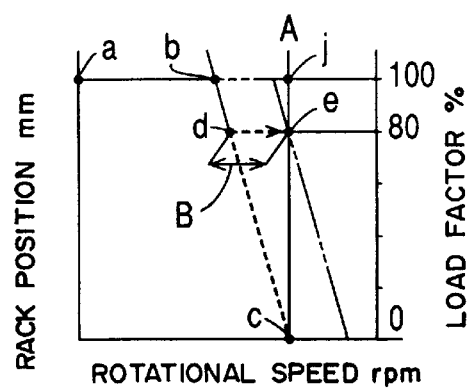
FIG. 2 is a diagram for explaining single operations of a first generator of the present invention and that of the prior art.

The single load operation of the first diesel engine driven generator 1a is described with reference to FIG. 2. FIG. 2 shows the rack position (mm) of the first fuel injection pump 28a in ordinate and the rotational speed (rpm) of the first fuel injection pump 28a in abscissa. The rack position in the ordinate has one to one correspondence to the load factor (%) of engine output. Indicated from an operating point a to an operating point b is the upper limit of the rack position, which corresponds to 100% of the load factor. An operating point j indicates a rated output/rated rotational speed of the engine 2a. Indicated from the operating point b to an operating point c is an actual range of use, which corresponds to an operating range of the first governor 29a. A rated rotational speed A is determined by the number of electrodes and the frequency of the generator in case of an engine for the generator. For example, if the number of electrodes is 4 and the frequency is 60 Hz, the rated rotational speed A is 1800 rpm.

Upon no-load operation after completion of engine warm up, the rack position is at an operating point c. Then when the first generator 25a is connected to the bus bar 23 by turning the first breaker 22a "ON" and a load, e.g., of 80% of the rated output value, is applied to the first generator 25a from the outside, the first governor 29a acts to shift the rack position from the operating point c to an operating point d. At the same time, the amount of fuel injection to the first engine 2a, and hence its output power, increases. However, the rotational speed at the operating point d is decreased by B from the rated rotational speed A, and needs to be increased to an operating point e.

The increase in the rotational speed from the operating point d to the operating point e is controlled by the first controller 3a. In this case, an engine rotational speed signal from the first rotational speed sensor 31a is inputted to the first controller 3a via the wire 6a. Upon receipt of the signal, the first controller 3a inputs a signal corresponding to the increased rate B of the rotational speed to the first actuator 30a via the wire 5a to move the lever 33a on the first actuator 30a in a direction of "INCREASE" in rotational speed, and hence the control lever 32a via the rod 34a. The rotational speed is increased to a predetermined rotational speed, e.g., to a rated rotational speed A of 1800 rpm.

Thus the single load operation of the first diesel engine driven generator 1a is carried out at the operating point e by an engine output corresponding to a load of 80% of the rated output value of the first generator 25a.

Next, a parallel load operation of the first and second diesel engine driven generators 1a and 1b will be described with reference to FIGS. 3 and 4.

First of all, the description is made of a first example of operation in which the first generator 25a is operated while gradually decreasing its load from 80% to 40% and the second generator 25b is operated from an unloaded condition while gradually increasing its load from 0% to 40%.

Figure 3:
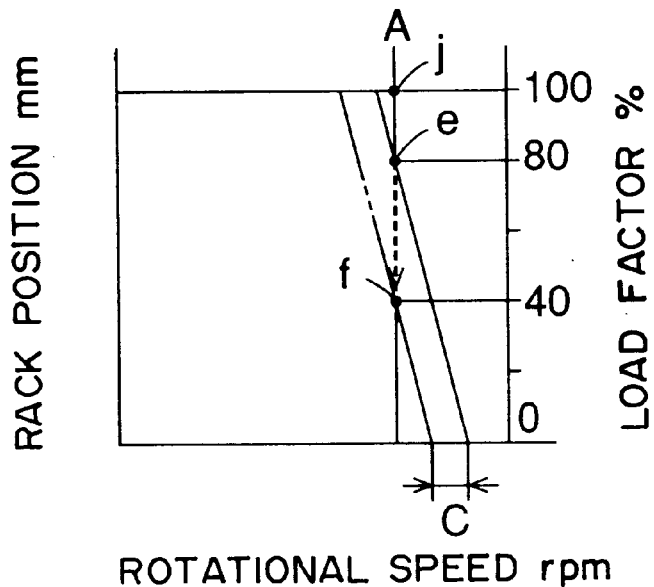
FIGS. 3 and 4 are diagrams for explaining plural load operations of first and second generators of the present invention and those of the prior art.
Figure 4:
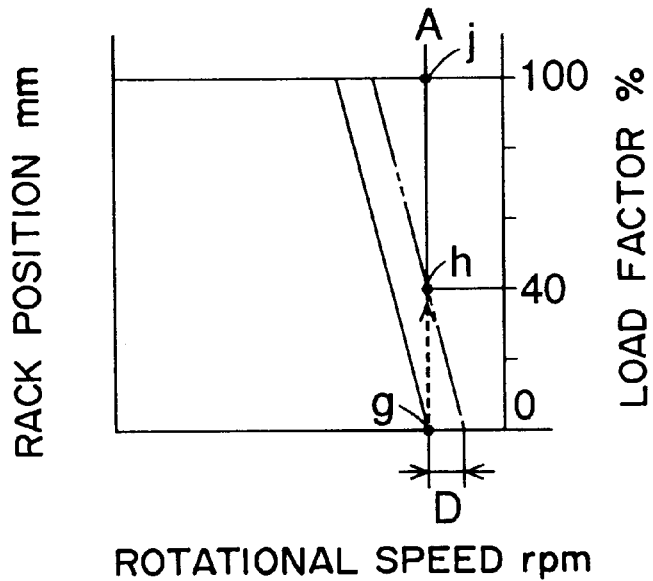

The 80% loaded operation of the first generator 25a is indicated at the operating point e in FIG. 3; the unloaded operation of the second generator 25b is indicated at an operating point g in FIG. 4. An operator starts the second engine 2b when the load on the first generator 25a exceeds 80%, and then turns on the second breaker 22b when a temperature rise in the second engine 2b above a predetermined value is detected. The load on the first engine 1a is inputted to control means, or the second controller 3b, via respective wires 8a and 8b. The second controller 3b compares the load on the first engine 2a inputted thereto with the load on the second engine 2b, calculates the amount of fuel injection required for increasing the load on the second engine 2b, and outputs a command so as to inject a predetermined amount of fuel into the second fuel injection pump 28b. As the load on the second engine 2b increases due to the increase in the amount of fuel injection, the load on the first engine automatically decreases. When the loads on the first and second engines 2a and 2b have become identical, the increasing of the load on the second engine 2b is stopped, thus automatically distributing loads evenly on the first and second engines 2a and 2b.

Next, the description is made of a second example of parallel load operation according to the embodiment.

In this case, a comparison between the 80% load factor of the first generator 25a and the 0% load factor of the second generator 25b is made via the parallel line bus bar 38. The first rack sensor 4a, installed on the first fuel injection pump 28a, detects an output of the first engine 2a. The detected signal is inputted to the first controller 3a via the wire 7a, and a load factor is calculated therefrom. At the same time, the second rack sensor 4b, installed on the second fuel injection pump 28b, detects an output of the second engine 2b. The detected signal is inputted to the second controller 3b via the wire 7b, and a load factor is calculated therefrom. Then, only the larger one of the load factors calculated at the first and second controllers 3a and 3b is supplied to the parallel line bus bar.

In other words, only the larger one of two signals is supplied to the parallel line bus bar 38: one indicating a rack position corresponding to the 80% load factor of the first generator 25a, the other for a rack position corresponding to the 0% load factor of the second generator 25b. Since the load factor of the first generator 25a is identical to the load factor of the parallel line bus bar 38, the first controller 3a does not issue a command that its load factor be changed. On the other hand, since the load factor of the second generator 25b is smaller than the load factor of the parallel line bus bar 38, the second controller 3b issues a command to the second actuator 30b so as to increase its load factor. If the load factor of the second generator 25b is 10%, since the total load factor is 80%, the load factor of the first generator 25a drops to 70%, and the signal flowing through the parallel line bus bar 38 also becomes 70%. The 10% load factor of the second generator 25b, however, remains lower than the 70% load factor of the parallel line bus bar, and the command that the load factor be changed is continuously issued from the second controller 3b.

Such operation achieves the automation of a gradual transition of the load factor, so that the load factor of the first generator 25a becomes 80, 70, 60, 50 and 40%, the load factor of the second generator 25b becomes 0, 10, 20, 30 and 40%, and finally the load distribution is made even. In other words, the loaded condition of the first generator 25a in FIG. 3 is decreased from the 80% load factor at the operating point e to the 40% load factor at the operating point f, while the loaded condition of the second generator 25b in FIG. 4 is increased from the 0% load factor at the operating point g to the 40% load factor at the operating point h. Thus the loaded conditions of both generators are made equivalent at the 40% load factor. In this embodiment, the description was made to the case where the first generator 25a is started at a high load factor of 80%. Conversely, the second generator 25b can be started at the high load factor of 80%.

Figure 5:
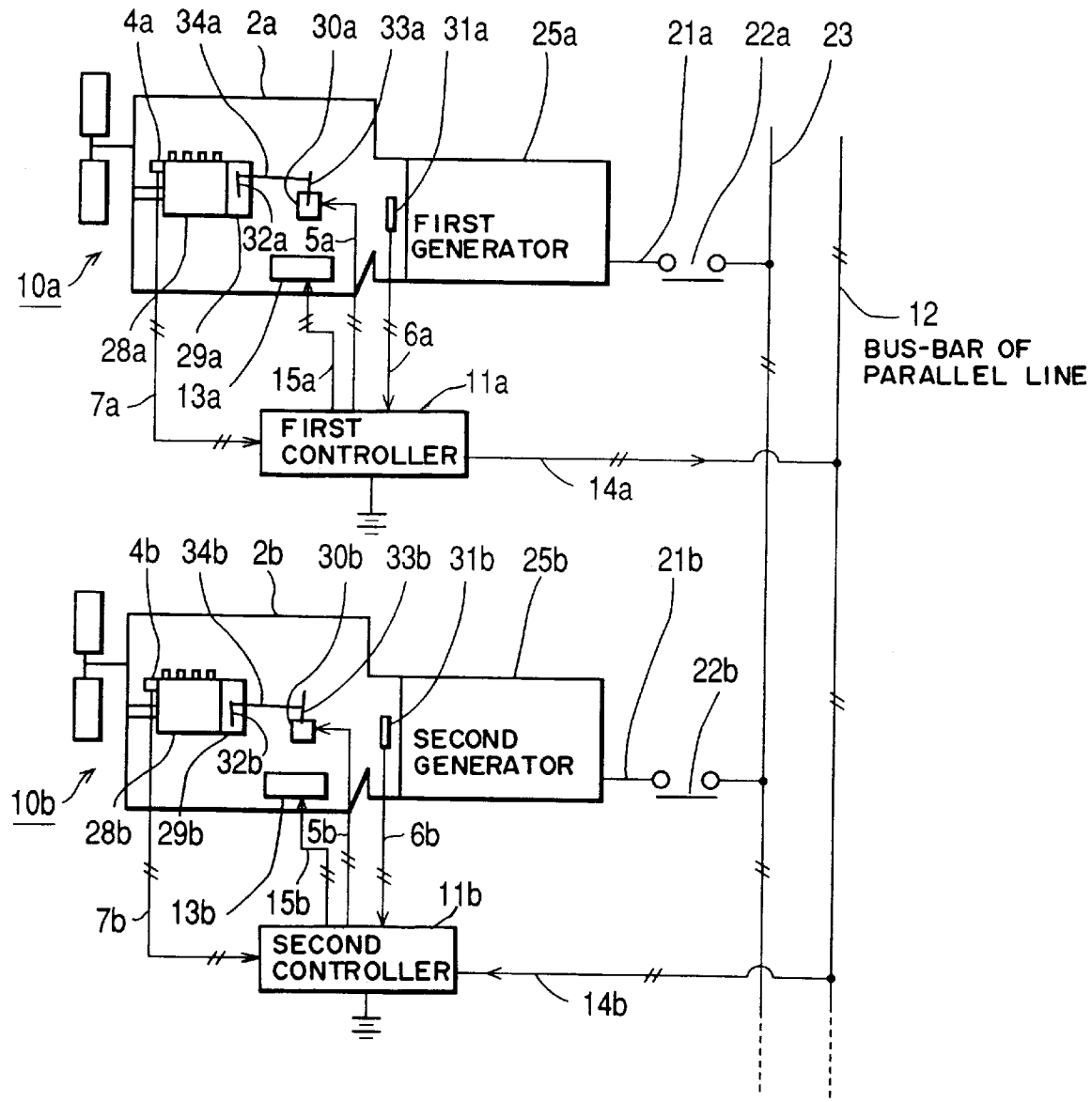
FIG. 5 is a diagram of the general construction of an automatic load distributing apparatus for generators according to a second embodiment of the present invention.
Figure 6:
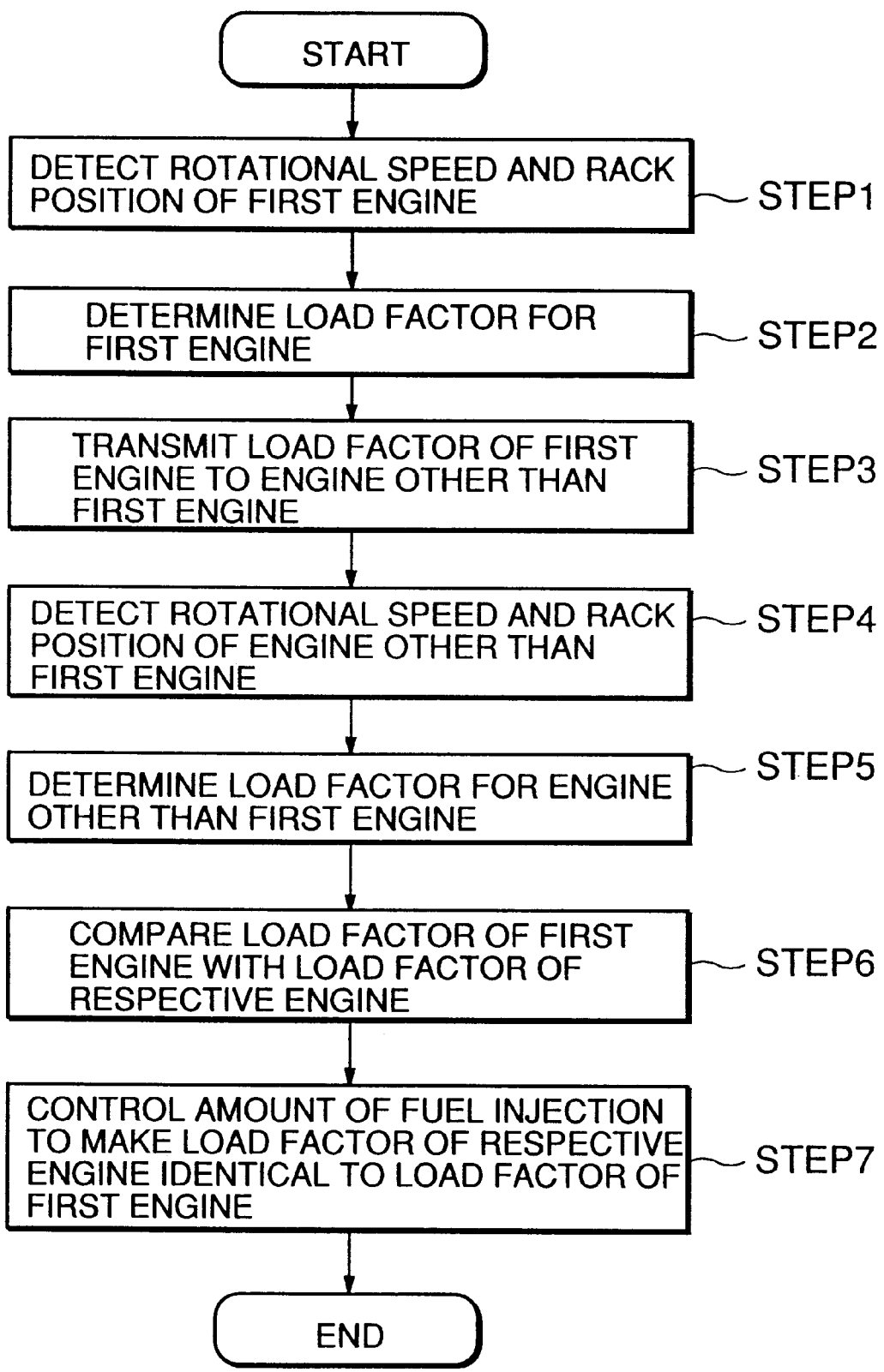
FIG. 6 is a flowchart showing a first example of the operation of the automatic load distributing apparatus for generators according to the second embodiment of the present invention.
Figure 7:
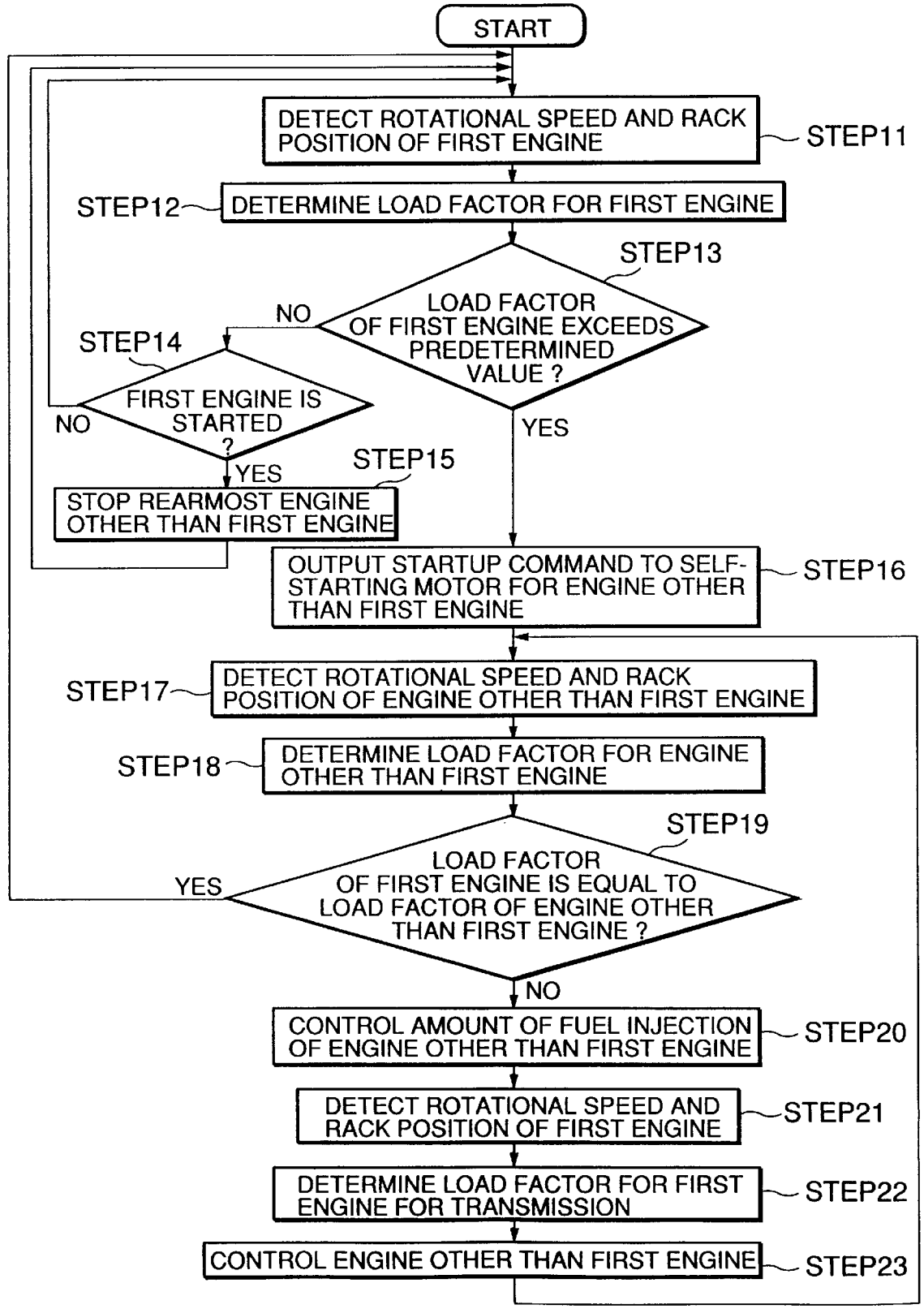
FIG. 7 is a flowchart showing a second example of operation of the automatic load distributing apparatus for generators according to the second embodiment of the present invention.
Figure 8:
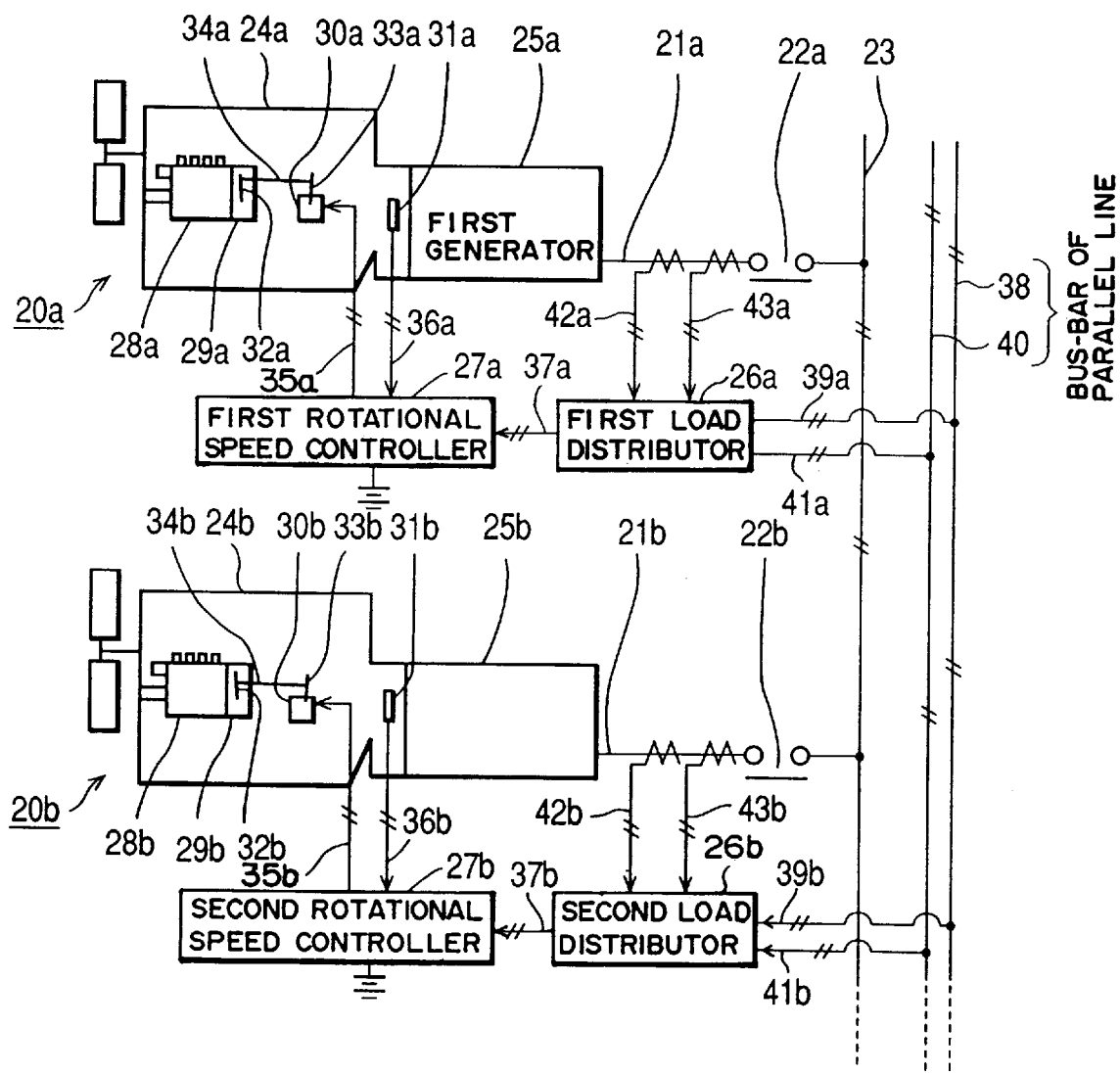
FIG. 8 is a diagram of the general construction of a conventional automatic load distributing apparatus for generators.

Referring next to FIGS. 5 to 7, the second embodiment of the present invention will be described.

In this embodiment, a description is made of a first example of a control operation in which the load factor of the first engine 2a is compared with the load factors of respective engines other than the first engine 2a, and the load factors of the respective engines are made to be identical to the load factor of the first engine 2a. Next, a description is made of a second example of automatic control operation in which respective engines for driving a plurality of generators are started sequentially according to a load, and the load factor is sequentially increased for each engine, except the one that has a maximum load factor, in such a manner as to make each load factor identical to the maximum load factor.

FIG. 5 is a diagram of the general construction of an automatic load distributing apparatus for generators. Components common to those of the first embodiment are given the same reference numerals and the description thereof is omitted. Hereinbelow, the description is made of the first diesel engine driven generator 1a. The second diesel engine driven generator 1b has the same construction and the description thereof is omitted.

In FIG. 5, constructive differences between this embodiment and the first embodiment are present in a first controller 11a and a first self-starting motor 13a. The first controller 11a is connected to a bus bar 12 via a wire 14a, and to the first self-starting motor 13a via a wire 15a.

First of all, a description is made to a first example of operation according to the embodiment with reference to the flowchart of FIG. 6.

FIG. 6 is a flowchart of a control operation in which the load factor of the first engine 2a is compared with the load factors of respective engines other than the first engine 2a and the load factors of the respective engines are made to be identical to the load factor of the first engine 2a.

In step 1, the rotational speed and the rack position of the first engine 2a are detected. The rotational speed signal from the first rotational speed sensor 31a is inputted to the first controller 11a via the wire 6a. The rack position signal from the first rack sensor 4a is inputted to the first controller 22a via the wire 7a.

In step 2, a load factor is determined for the first engine 2a. The first controller 11a operates the input signals to determine the load factor.

In step 3, the load factor of the first engine 2a is transmitted to the respective engines other than the first engine 2a. For example, the load factor is transmitted from the first controller 11a to a second controller lib via the wire 14a, the parallel line bus bar 12 and the wire 14b.

In step 4, the rotational speeds and the rack positions of respective engines other than the first engine 2a are detected. For example, the rotational speed of the second engine 2b is detected by the second rotational speed sensor 31b and inputted to the second controller 11b via the wire 6b. The rack position is detected by the second rack sensor 4b and inputted to the second controller 11b via the wire 7b.

In step 5, the load factors are determined for the respective engines other than the first engine 2a. For example, the second controller 11b operates the input signals to determine the load factor for the second engine 2b. The load factor is transmitted to the parallel line bus bar 12.

In step 6, the load factor of the first engine 2a, transmitted to the parallel line bus bar 12, is compared with the load factors of the other respective engines. For example, the second controller 11b compares the load factor transmitted from the first engine 2a with the load factor of the second engine 2b.

In step 7, the amount of fuel injection to each respective engine is controlled in such a manner as to make the load factors of the respective engines identical to the load factor of the first engine 2a. For example, the amount of fuel injection to the second engine 2b is controlled in such as manner as to make the load factor of the second engine 2b identical to the load factor of the first engine 2a which has become a maximum load factor. To do this, a signal is sent from the second controller 11b to the actuator 30b via the wire 5b to actuate the second governor 29b via the lever 33b, the rod 34 and the control lever 32b.

As described above, the load factor of the first engine 2a and the load factors of the other respective engines are compared, and the amount of fuel injection to the other respective engines is controlled in such a manner as to make the load factors of the respective engines identical to the load factor of the first engine 2a. This makes it possible to automatically distribute loads evenly on the first engine 2a and the other respective engines.

Next, a description is made of a second example of operation according to the embodiment with reference to the flowchart of FIG. 7.

FIG. 7 is a flowchart of automatic control operation in which respective engines for driving a plurality of generators are started sequentially according to the load, and the load factors of the engines, except one that has a maximum load, are increased sequentially so as to make the load factor of each engine identical to the maximum load factor. Here, a detailed description of steps common to those in the first example is omitted.

In step 11, the rotational speed and the rack position of the first engine 2a are detected.

In step 12, a load factor is determined for the first engine 2a by the first controller 11a.

In step 13, it is determined whether or not the load factor of the first engine 2a exceeds a predetermined value. The operation then advances to step 16 if it exceeds the predetermined value, and to step 14 if not.

In step 14, it is determined whether or not respective engines other than the first engine 2a are started. The operation returns to step 11 if not started, and advances to step 15 if started.

In step 15, the rearmost engine, other than the first engine 2a, is stopped, and then the operation returns to step 11.

In step 16, startup commands are outputted to self-starting motors of the engines other than the first engine 2a. For example, the second controller 11b outputs a startup command to the second self-starting motor 13b to start the second engine 2b.

In step 17, the rotational speed and the rack position of the engine other than the first engine 2a are detected.

In step 18, a load factor is determined for the engine other than the first engine 2a.

In step 19, it is determined whether or not the load factor of the first engine 2a is equal to that of the engine other than the first engine 2a. The operation then advances to step 20 if not equal, and returns to step 11 if equal.

In step 20, the amount of fuel injection to the engine other than the first engine 2a is controlled.

In step 21, the rotational speed and the rack position of the first engine 2a are detected.

In step 22, a load factor is determined for the first engine 2a to transmit the value to the bus bar 12 of parallel line.

In step 23, the load factor of the engine other than the first engine 2a is compared with that of the first engine, and the amount of fuel injection to the engine is controlled in such a manner as to make the load factor of the engine other than the first engine 2a identical to the load factor of the parallel line bus bar 12.

Then, the operation returns to step 17, and steps 17 through 23 are repeated until the load factor of the engine other than the first engine 2a becomes equal to that of the first engine 2a.

When both load factors become equal, the operation returns from step 19 to step 11. Then, determination is made as to whether or not the load factor of the first engine 2a exceeds the predetermined value. If the load factor still exceeds the predetermined value, a further subsequent engine (e.g., a third engine, not shown) is started. If the load value is below the predetermined value, the engine (e.g., the second engine 2b) is stopped.

As described above, the load factor of the first engine 2a is compared with the load factor of the subsequent engine to control the amount of fuel injection to the engine other than the first engine 2a. If the load factor of the first engine 2a has still exceeded the predetermined value, a further subsequent engine is started. Thus loads are automatically distributed evenly on the first engine 2a and the engine or engines that have received the startup commands.

Although the embodiment was described using the first engine 2a as the base unit, any other engine such as the second engine 2b can be used as the base unit. In this case, the load factor of the second engine 2b is compared with a load factor of an engine other than the second engine 2b to control the amount of fuel injection to the engine compared.

According to the present invention, the automatic load distributing apparatus for parallel load operation of a plurality of generators connected in parallel is such that loads on the generators are detected at rack sensors of respective engines, and the control means is made compact by integrating a first load distributing unit with a first rotational speed controller, and the construction is simplified to reduce the space occupied by the apparatus to one-half of the conventional one. Also, since outgoing connection for load detection can be of simple single-phase wiring of low voltage and low current without the need for a transformer, the number of assembling steps is largely reduced, and the danger of shock due to mishandling in maintenance and outfitting operations is avoided. Further, loads can be automatically distributed evenly on respective engines upon parallel load operation of generators of different capacities.

In addition, the control method allows the apparatus to command that the engines are started sequentially while confirming the maximum engine load factor and increase the load factor for each engine in such a manner as to make that load factor to be identical to the maximum load factor. This makes it possible to provide labor saving of operation. The parallel line bus bar can also be simplified since it is required for the maximum load factor signal alone.

Industrial Applicability

The present invention is applicable to an automatic load distributing apparatus and a control method therefor, in which the apparatus is of simple construction and occupies a small space, and can automatically distribute loads evenly on respective engines upon parallel load operation of generators of different capacities and provide labor saving of operation.

I claim:

1. An automatic load distributing apparatus comprising:
    a plurality of generators connected in parallel to a common load;
    a plurality of engines, each of said engines being adapted to drive a respective one of said plurality of generators, said plurality of engines including a first engine and a second engine;
    a plurality of fuel injection pumps, each of said fuel injection pumps being installed on a respective one of said plurality of engines;
    a first rotational speed sensor for detecting a rotational speed of said first engine;
    a first rack sensor for detecting a load on said first engine;
    a second rotational speed sensor for detecting a rotational speed of said second engine;
    first control means; and
    second control means;
    said first control means being adapted for receiving signals from said first rotational speed sensor and said first rack sensor, for outputting a command to the fuel injection pump for said first engine so as to maintain said first engine at a constant rotational speed which can be increased or decreased according to the load on said first engine, and for outputting a command to said second control means to increase a load on the second engine when the load on said first engine exceeds the load on said second engine; and
    said second control means being adapted for comparing a load signal from said first control means with the load on said second engine and outputting a command to the fuel injection pump on said second engine so as to make the load on said second engine to be identical to the load on said first engine.

2. An automatic load distributing apparatus in accordance with claim 1, further comprising a second rack sensor for detecting a load on said second engine; and
    wherein said first control means receives signals from said first rotational speed sensor and said first rack sensor, outputs a command to the fuel injection pump for said first engine so as to maintain said first engine at a constant rotational speed which can be increased or decreased according to the load on said first engine, outputs a command to said second control means to increase the load on said second engine when the load on said first engine exceeds the load on said second engine, and stops increasing the load on said second engine when the loads on said first and second engines have become identical after the output of said first engine has automatically decreased accompanying the increase in the load on said second engine.

3. An automatic load distributing apparatus comprising:
    a plurality of generators connected in parallel to a common load;

a plurality of engines, each of said engines being adapted to drive a respective one of said plurality of generators, said plurality of engines including a first engine;

a plurality of fuel injection pumps, each of said fuel injection pumps being installed on a respective one of said plurality of engines;

a first rotational speed sensor for detecting a rotational speed of said first engine;

a first rack sensor for detecting a load on the first engine;

each individual one of said plurality of engines other than said first engine having a rotational speed sensor associated therewith for determining a rotational speed of the respective one of the engines other than the first engine;

each individual one of said plurality of engines other than said first engine having a rack sensor associated therewith for determining a load on the respective one of the engines other than the first engine;

first control means for receiving signals from said first rotational speed sensor and said first rack sensor, and for determining a load factor (output/rated output×100) for said first engine to issue the same to the respective engines other than the first engine; and each individual one of said plurality of engines other than said first engine having a respective control means for determining a load factor for the respective one of the engines other than the first,engine, and for comparing the load for the respective one of the engines other than the first engine with an output of said first control means to output a command to the fuel injection pump for the respective one of the engines other than the first engine so as to make the respective load factors to be identical to the load factor of said first engine which has become a maximum load factor.

4. An automatic load distributing apparatus in accordance with claim 3, wherein said first engine comprises a first self-starting motor and each individual one of the engines other than said first engine comprises a respective self-starting motor; and wherein said first control means receives signals from said first rotational speed sensor and said first rack sensor, and determines the load factor for said first engine to sequentially issue startup commands to the respective self-starting motors so as to prevent overload when the load factor for said first engine exceeds a predetermined value.

5. A method of controlling an automatic load distributing apparatus for generators, said method comprising the steps of:

starting at least one of a plurality of engines, each individual one of said plurality of engines being for driving a respective one of a plurality of generators which are connected in parallel to a common load;

determining a load factor for each individual one of said plurality of engines so as to detect a maximum load factor as a result of a comparison of the respective load factors;

transmitting the maximum load factor sequentially to engines other than the engine of which the load factor has become the maximum load factor; and increasing the load factors of the respective engines, other than engines of which the load factor has become the maximum load factor, sequentially in such a manner as to sequentially make the load factor of each engine to be identical to the maximum load factor.

* * * * *